United States Patent [19]
Busak et al.

[11] Patent Number: 6,064,310
[45] Date of Patent: May 16, 2000

[54] SECURITY SYSTEM WITH HVAC FAULT REPORTING

[76] Inventors: Steven J. Busak, 29737 Niguel Rd. - Apt. E, Laguna Niguel, Calif. 92677; Gary A. Smith, 10620 40th Ave. North, Plymouth, Minn. 55441

[21] Appl. No.: 08/416,939

[22] Filed: Mar. 31, 1995

Related U.S. Application Data

[63] Continuation of application No. 08/075,713, Jun. 11, 1993, abandoned.

[51] Int. Cl.[7] .................................................... G01K 1/20
[52] U.S. Cl. ........................ 340/588; 340/584; 340/585; 340/870.17; 62/158; 236/94; 236/15 BG; 364/577
[58] Field of Search ..................... 340/584, 588, 340/585, 870.17; 236/15 BG, 94, 46 R; 364/557, 579, 505; 374/30, 102, 112; 62/157, 158, 159

[56] References Cited

U.S. PATENT DOCUMENTS

| | | | |
|---|---|---|---|
| 4,276,925 | 7/1981 | Palmieri | 364/505 |
| 4,308,911 | 1/1982 | Mandl | 340/588 |
| 4,335,847 | 6/1982 | Levine | 236/46 R |
| 4,399,428 | 8/1983 | Hughes | 340/500 |
| 4,441,329 | 4/1984 | Dawley | 236/94 |
| 4,606,401 | 8/1986 | Levine et al. | 165/12 |
| 4,629,336 | 12/1986 | Ishizaka | 364/557 |
| 4,853,693 | 8/1989 | Eaton-Williams | 340/588 |
| 4,882,564 | 11/1989 | Monroe | 340/588 |
| 5,203,497 | 4/1993 | Ratz | 236/46 R |

*Primary Examiner*—Jeffery Hofsass
*Assistant Examiner*—Albert K. Wong

[57] ABSTRACT

The performance of an HVAC system in a building is monitored by connecting a thermostat to an alarm system which is equipped to provide notification of alarm conditions through telecommunication or other direct means to some responsible entity. The alarm system access to telecommunications is employed to forward indicators of HVAC fault to predetermined offsite locations from where corrective action can be provided. The system includes a presumed fault condition processor which employs data from the thermostat to indicate to the alarm system that notification should take place.

2 Claims, 8 Drawing Sheets

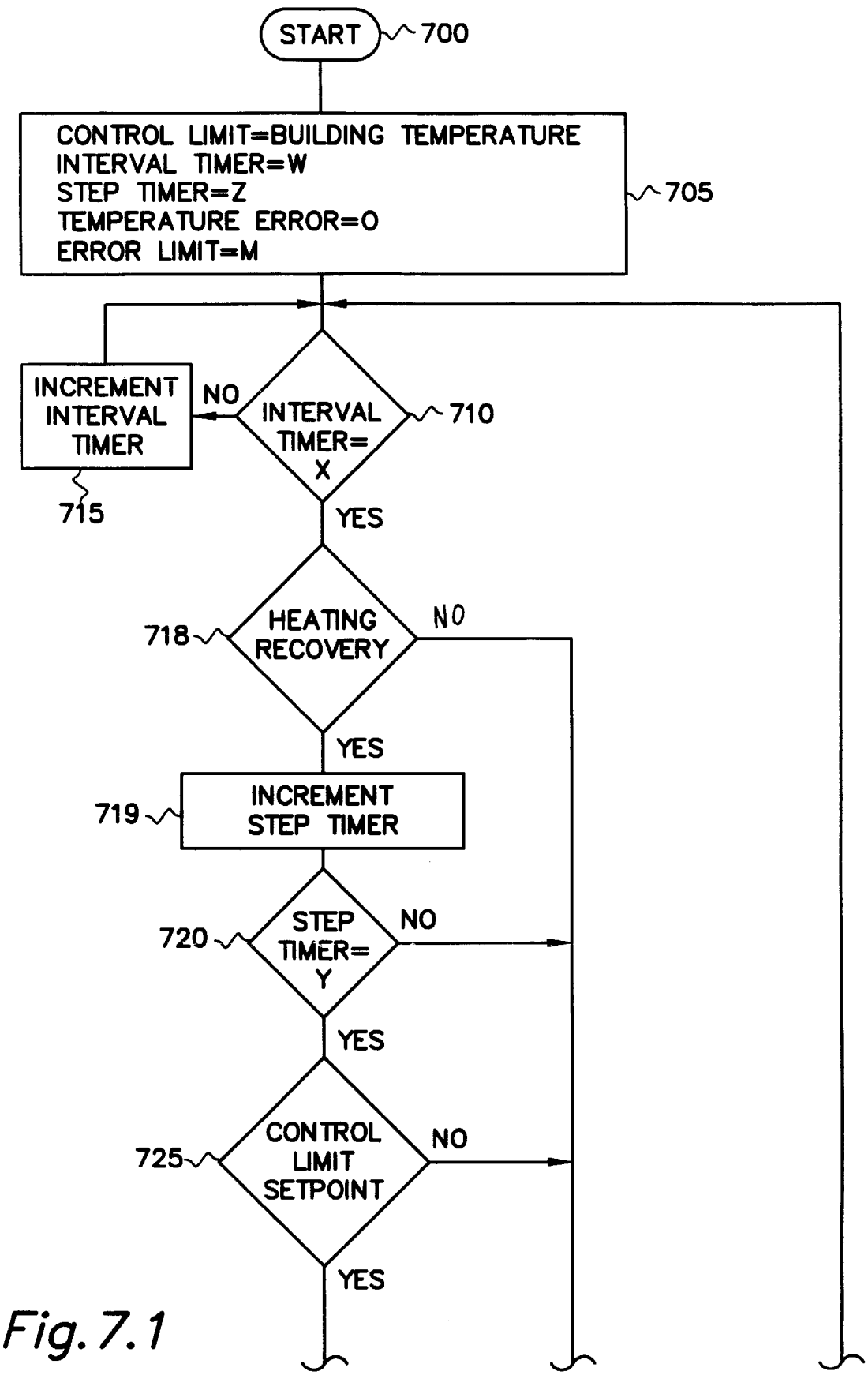
Fig. 7.1

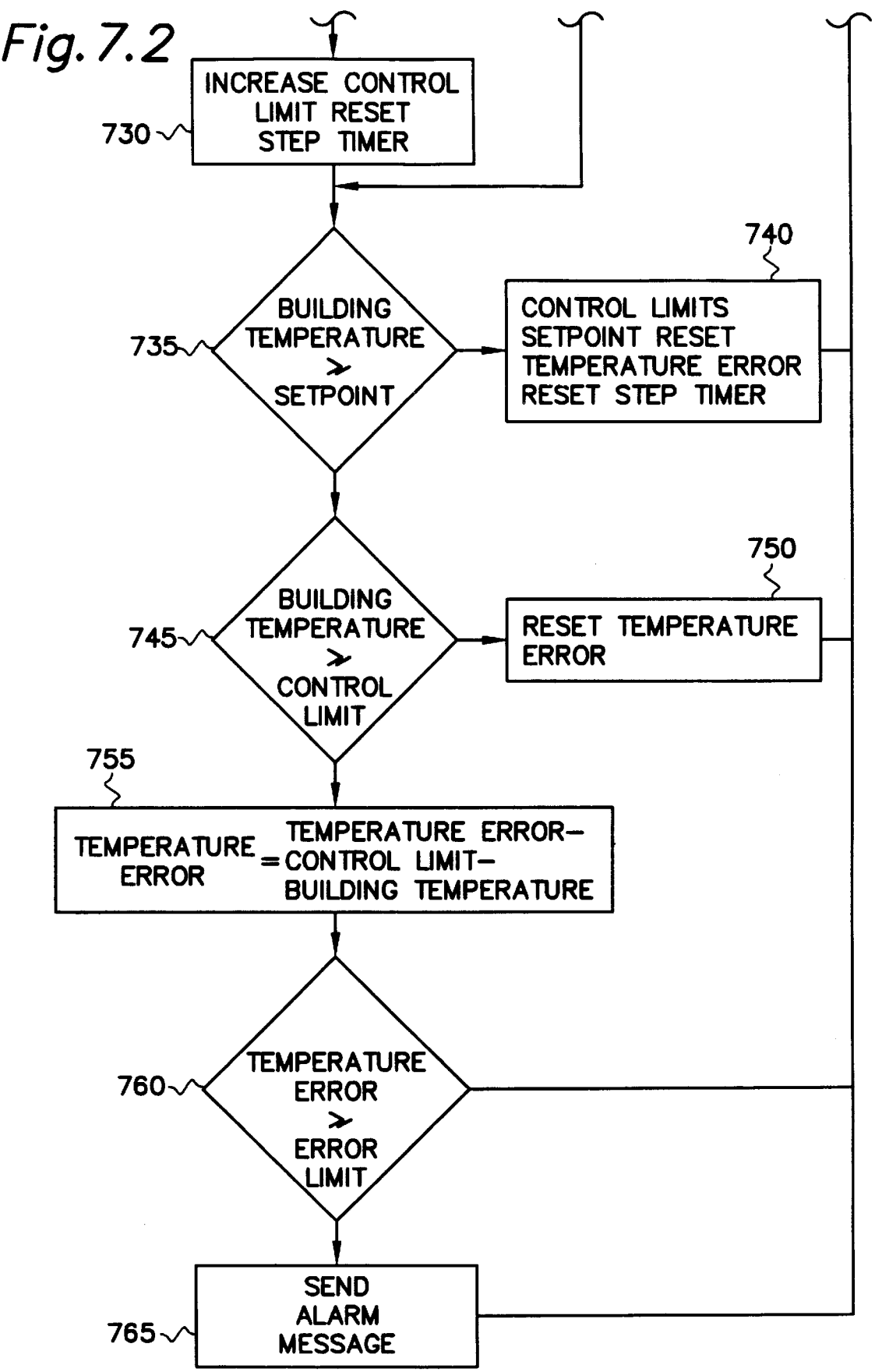
Fig. 7.2

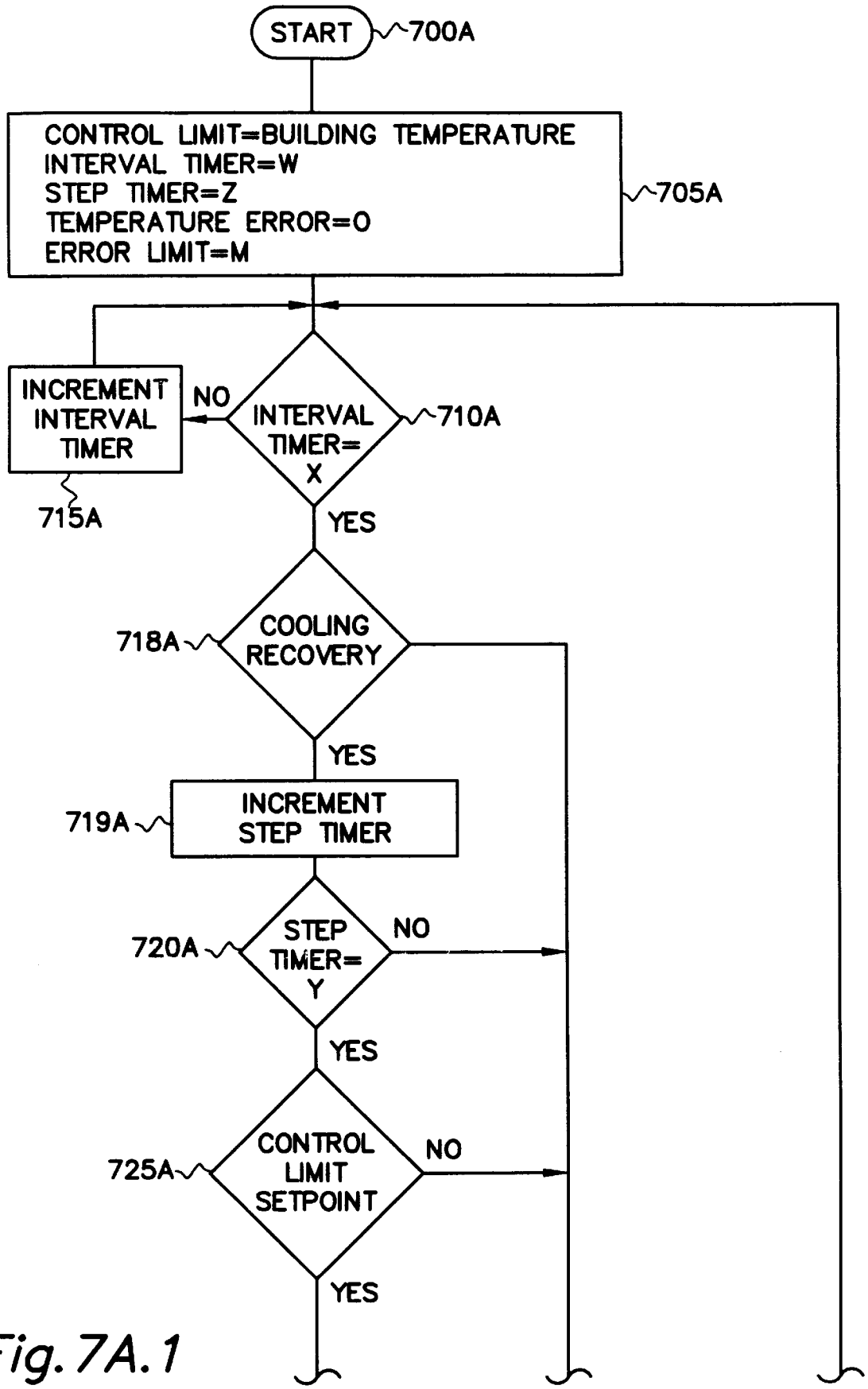
Fig. 7A.1

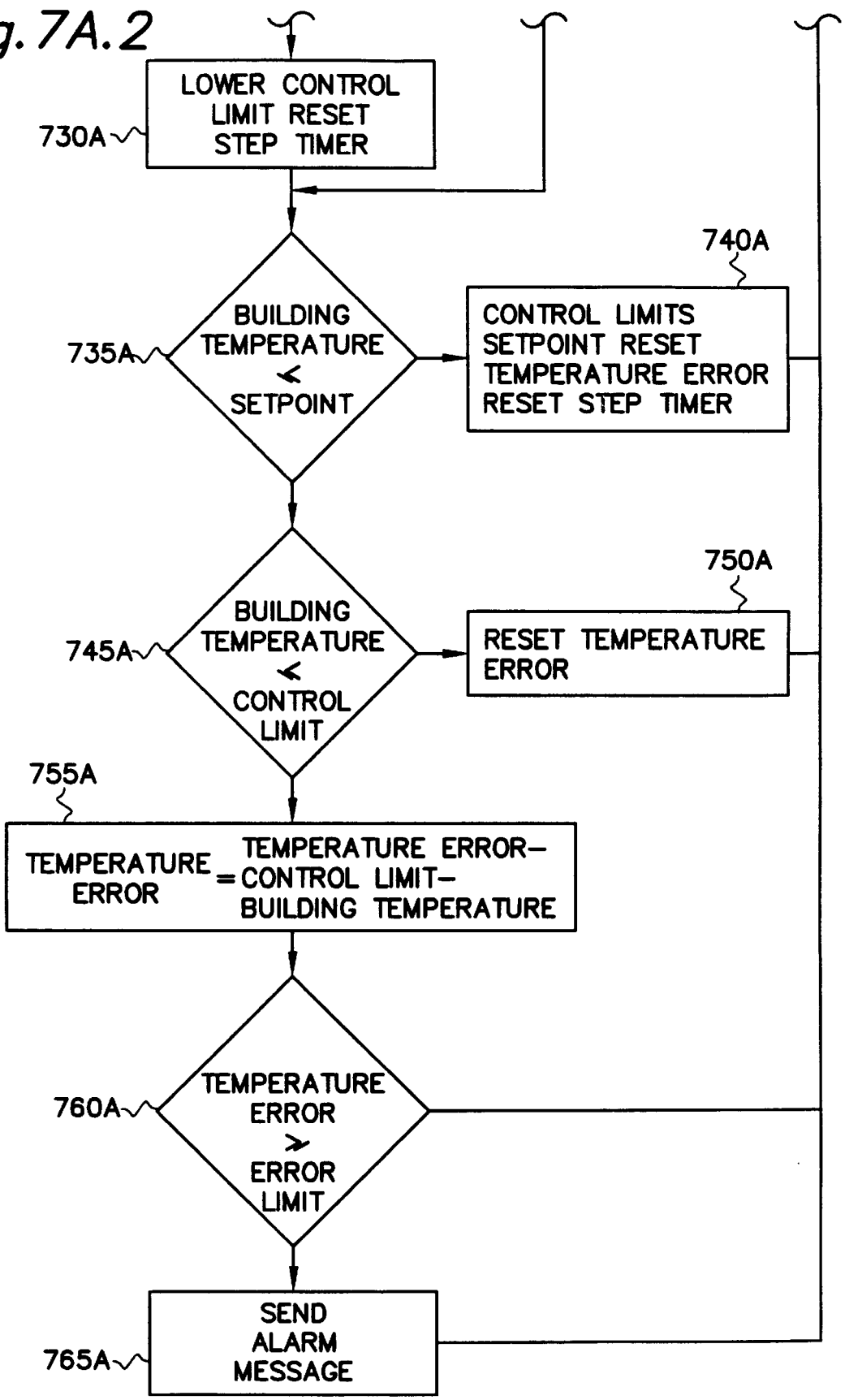
Fig. 7A.2

SECURITY SYSTEM WITH HVAC FAULT REPORTING

This application is a continuation of application Ser. No. 08/075,713, filed Jun. 11, 1993 now abandoned.

This invention relates generally to control systems and more particularly to building automation systems.

Control systems for controlling the Heating, Ventilation and Air Conditioning (HVAC) in a building have typically included a thermostat for control of a temperature within a space. The thermostat operates to a setpoint, the setpoint being representative of a desired temperature for the space. The thermostat controls the cycling of equipment such as air conditioners and furnaces to supply conditioned air to the controlled space until the space temperature matches the setpoint temperature.

Occasionally, when there is a fault in the HVAC system or the thermostat, the actual space temperature may not rise to equal the setpoint temperature when the HVAC is in a heating mode or fall to equal the setpoint temperature when the HVAC system is in a cooling mode. When this occurs, it may be important to notify the building owner or operator of an HVAC system fault. To this end, thermostat alarm systems were created such as the systems shown and described in U.S. Pat. Nos. 4,399,428 and 4,240,077. However, there are times when it may be beneficial for someone outside of the building to know of the HVAC system fault.

Further, the prior art systems caused an alarm to sound every time the actual temperature crossed the alarm temperature. This could be annoying, especially if such actual temperatures were momentary, and the HVAC system quickly compensated for the crossing.

BACKGROUND OF THE INVENTION

The present invention is a building automation system which includes an intrusion alarm and a thermostat in communication with each other. The building automation system thermostat includes means and a method for accumlating an error temperature over time, and creating an alarm signal indicative of an HVAC alarm system fault when the accumlated error exceeds a predetermined limit. This means or method may be located in either the thermostat or the intrusion alarm. The intrusion alarm system, which may be connected to a central monitoring station, can notify both the building owner and the central monitoring station of the HVAC system fault.

SUMMARY OF THE INVENTION

FIG. 7 is a flow chart of the presently inventive method as applied to an HVAC system in a heating mode.

FIG. 7A is a flow chart of the presently inventive method as applied to an HVAC system in a cooling mode.

DETAILED DESCRIPTION OF THE PREFERRED EMBODIMENT

Figure 1:
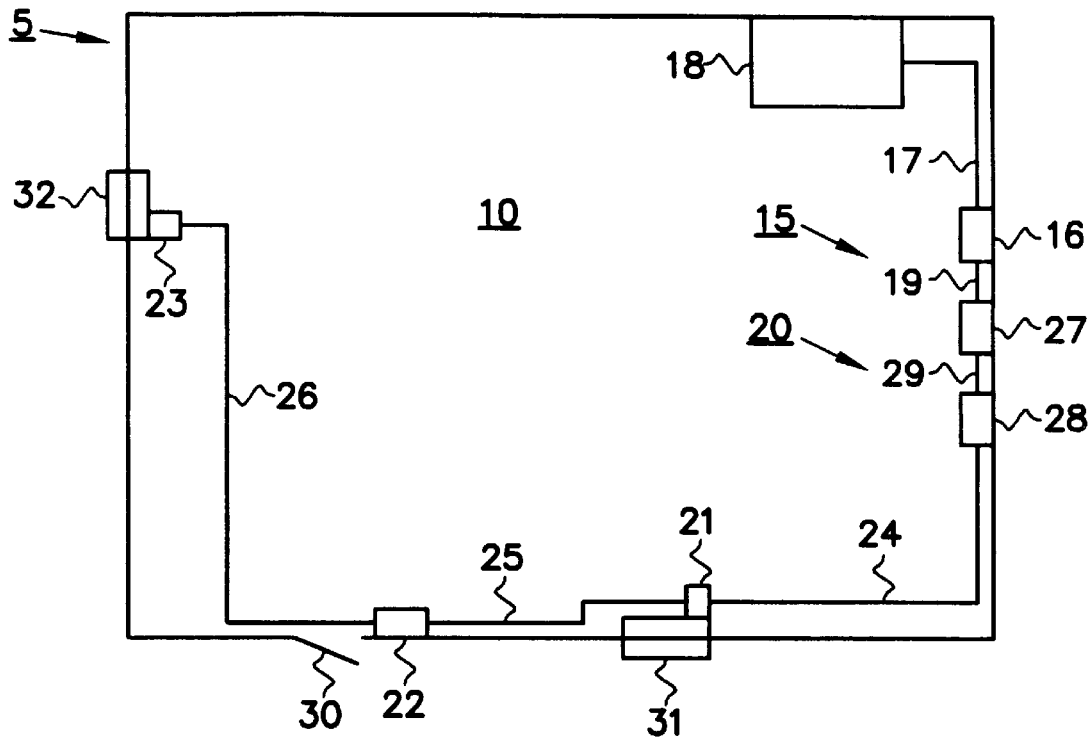
FIGS. 1–3 are block diagrams of the building automation system of the present invention.

Referring now to FIG. 1, there shown is a block diagram of the presently inventive building automation system, generally identified by the reference numeral 15, on the interior 10 of building 5. The building automation system may include thermostat 16, and security system 20, which may include operator interface 27 security panel 28 and sensors 21, 22 and 23. Security panel 28 may be connected to a telephone line (not shown).

Figure 2:
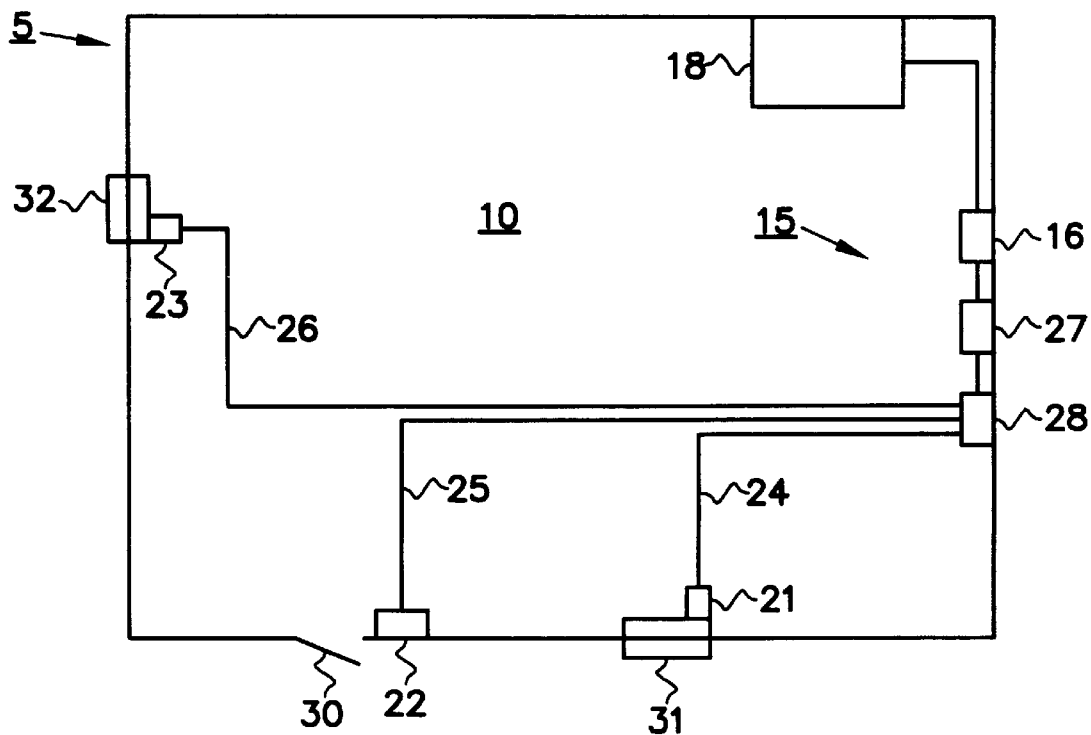
Figure 3:
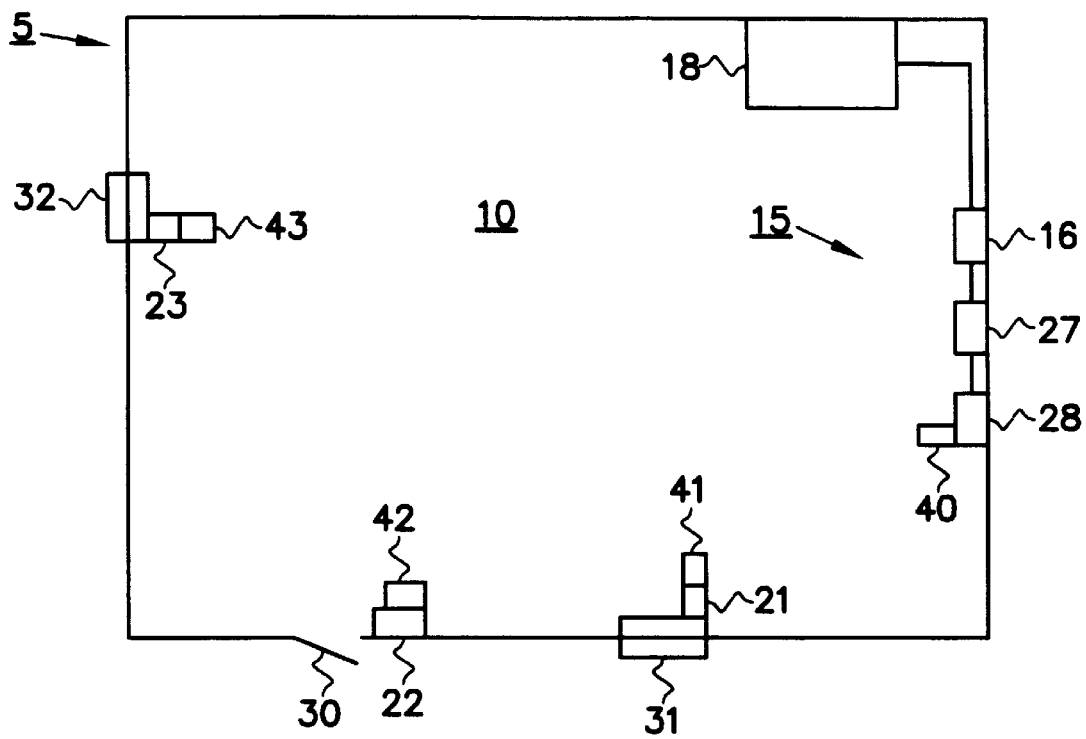

In operation, sensors 21–23 monitor the status of example door 30 and windows 31 and 32. Sensors 21–23 are connected to the security panel 28 by links 24–26 respectively. The links may be, for example, wire or fiber optics. It will be understood by those of ordinary skill in the art that many possible building configurations and many different types of sensors may be used while still falling within the spirit of the present invention. As examples of such modifications, the systems of FIGS. 2 and 3 are shown. In FIG. 2, serial links 24–26 are replaced with parallel links 24'–26'. In FIG. 3, the links are replaced with RF transmitters 41–43 and RF receiver 40.

Changes of state in the sensors are sensed at the panel 28 which may initiate an alarm at the occurence of such a change of state. For more information on the operation of a security system, the reader is directed to U.S. Pat. No. 5,225,806, issued on Jul. 6, 1993 to which was continued in application Ser. No. 08/441,236 Stanley-Arslanok et al. and U.S. patent application Ser. No. 08/216,873, which is a continuation of Ser. No. by Gregory et al. and which are commonly assigned with the present application. These applications are incorporated herein by reference.

Figure 4:
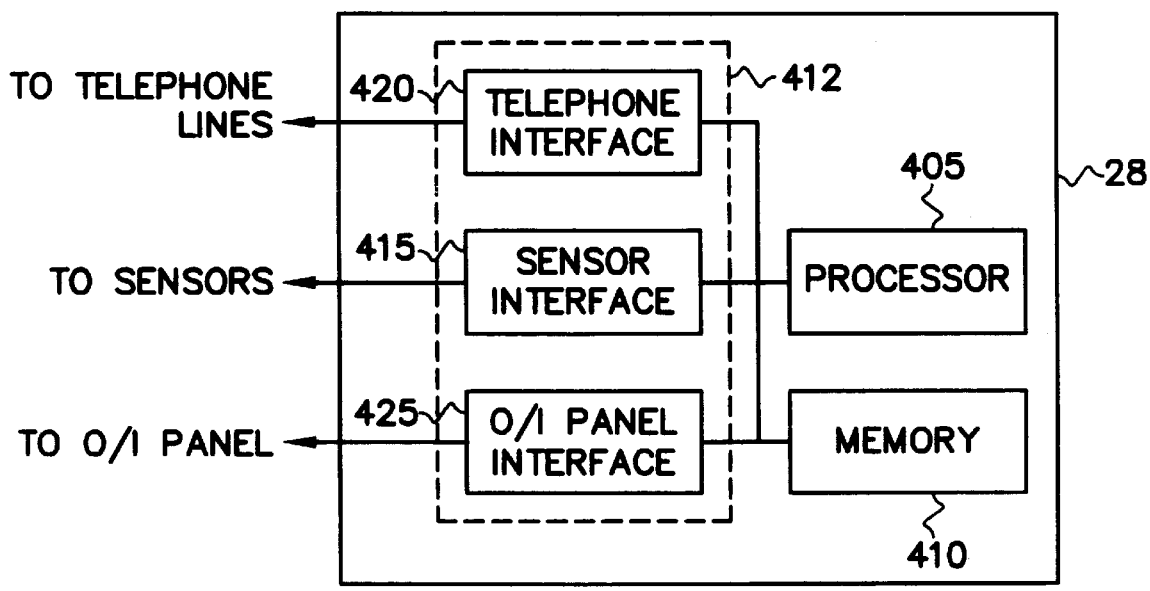
FIG. 4 is a block diagram of the intrusion alarm panel of the present invention.

Referring now to FIG. 4, thereshown is a block diagram of the alarm panel 28 of the present invention. The alarm panel 28 includes processor 405, memory 410, interface unit 412 which may include sensor interface 415, telephone interface 420 and O/I Panel interface 425. Processor 405 may be any standard microprocessor or microcontroller and operates on instructions and data stored in memory 410. Memory 410 may include both random access memory (RAM) and various forms of read only memory (ROM) and stores both instructions and data.

The interface unit 412 provides an interface between the processor and other devices which communicate with the processor. For devices such as the O/I Panel, the O/I Panel interface may operate using a communications protocol such as the protocol described in U.S. patent application Ser. No. 07/811,772 by Myers which is commonly assigned with the present application and incorporated herein by reference. The telephone interface may be a standard modem. The sensor interface could be a circuit for translating a switch opening or closure to an electrical signal which can be recognized by the microprocessor, or a receiver for RF sensors.

Figure 5:
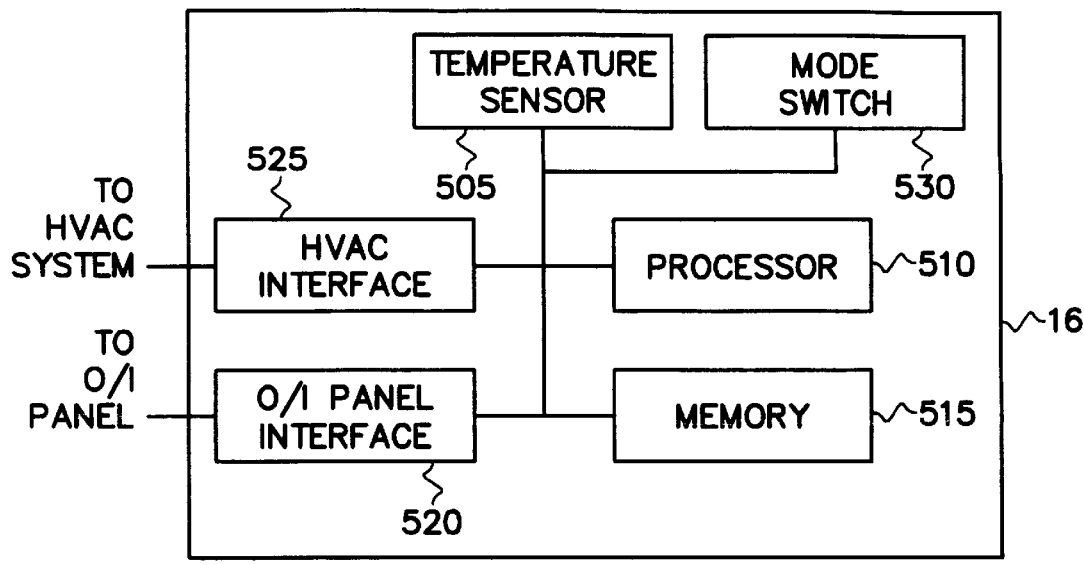
FIG. 5 is a block diagram of the thermostat of the present invention.

Referring now to FIG. 5, thereshown is one example of a thermostat 16 which could be used as part of the present invention. The thermostat 16 could include temperature sensor 505, processor 510, memory 515 and O/I interface 520, HVAC interface 525 and mode switch 525. Temperature sensor 505 produces a temperature signal representative of the temperature in the area of the sensor. The processor 510, which may be a microprocessor, receives the temperature signal and causes or ceases operation of the HVAC plant (not shown) based upon the temperature signal and instructions and data stored in memory 515. Such instructions may include a setpoint indicative of a temperature for the space which is desired by an operator and whether heating or cooling is desired. The heating or cooling information can be determined by appropriate setting of the mode switch 525.

Interface 520 is used to provide new instructions or data to memory 515 and to transmit information about the current temperature, setpoint and mode switch setting. In a preferred embodiment, the thermostat transmits through the interface the setpoint and current temperature everytime there is a change in either value or a change in the mode switch setting. The reasons for this are described with reference to FIGS. 7 and 7A. The interface 520 may use the aforementioned protocol described in U.S. patent application Ser. No. 07/811,772 by Myers. For more general information a on preferred thermostat for use in the present invention, the reader is directed to U.S. Pat. No. 5,203,497 "Communicating Thermostat", Ratz, et . al., U.S. Pat. No. 5,197,668; and "Communicating Thermostat", Ratz, et al., U.S. Pat. No. 5,203,497 and "Electronic Time Thermostat with a Temporary Next Period Adjustment Means", U.S. Pat. No. 5,230,482, all of which are commonly assigned with the present application and are incorporated herein by reference.

Figure 6:
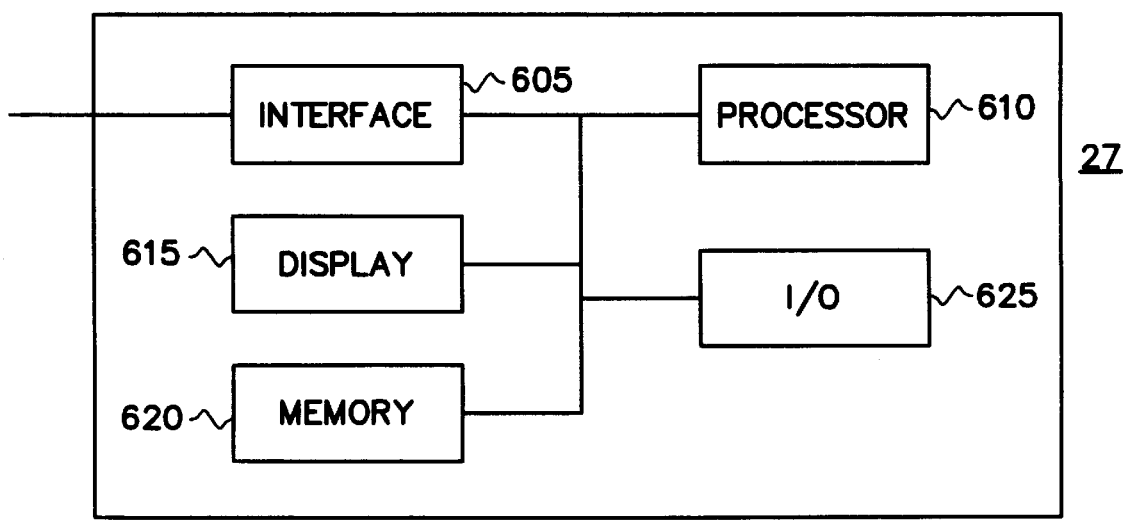
FIG. 6 is a block diagram of a preferred operator interface of the present invetion.

Referring now to FIG. 6, thereshown is a block diagram of an operator interface 27 used in the present invention. The operator interface 27 includes interface 605, processor 610, display means 615, memory 620 and input/output or I/O means 625.

Interface 605 receives signals from the other elements of the Building Automation System, such as thermostat 16 and alarm panel 28 and converts the signals into signals which processor 610 can understand. Similarly, interface 605 receives signals from the processor 610 and converts those signals into signals which other elements of the building automation system 15 can understand. Again, the protocol used may be as disclosed in U.S. patent application Ser. No. 07/811,772 by Myers.

Processor 610 is responsible for the general operation of the operator interface 27 and acts on instructions and data stored in memory 620. Memory 620 may include both RAM and ROM.

Display means 615 is used for displaying information and options to a building automation system operator. Examples might include a liquid crystal display, a light emitting diode display, a cathode ray tube display, or discrete light emitting diode (LED) or lamps with associated text printed in the vicinity of the LED or lamp.

I/O means 625 provides the building automation system operator with the ability to enter information or instructions into the building automation system. Examples include keyboards, touch screens, softkeys, and switches.

A preferred operator interface for use in the inventive building automation system is disclosed in U.S. patent application Ser. No. 08/000,956 by Metz. It should be noted that while a display means is desirable for the present invention, it is not a necessary element and the building automation system could operate efficiently without such a display means. An installer of such a building automation system may setup the building automation system to operate by using a disconnectable personal computer which has all of the elements noted for the display means, and thereafter, the system will run using the instructions and data which were programmed therein.

Referring now to FIG. 7, there shown is a flow chart of the presently inventive HVAC fault checking method to be used when the HVAC system is in a heat mode. It should be understood that while this method may be executed either in the thermostat, the display means or the alarm panel, the preferred location for this method is for the alarm panel to perform this operation. After starting at block 700, the method moves to block 705 where dependent variables Control_Limit, Interval_Timer, Step_Timer, Temp_Error and Error_Limit are intialized. Next, the interval timer is compared to a predetermined value X. If a predetermined relationship does not exist between the interval timer and X, here shown to be equality, then the Interval_Timer is incremented and the test run again as shown in blocks 710 and 715. The Interval_Timer is used to control how often the HVAC fault recognition method is performed.

If the relationship does exist, then the method moves on to block 718, where the method determines if a heat recovery period is underway. A heat recovery period occurs any time the HVAC system is in heat mode and the Setpoint is increased. If the HVAC system is not in a heat recovery period, the method moves to block 735. Otherwise, the method moves to block 719 where the Step_Timer is incremented. Next, the method moves to 720 where the current value of the Step_Timer is checked. If the Step_Timer does not have a predetermined relationship with a second predetermined variable, Y, the method moves to block 735.

If the predetermined relationship to Y does exist, the method moves on to block 725 where the Control_Limit compared to the Setpoint for a predetermined relationship, here, is the Control_Limit less than the Setpoint? If not, the method skips to step 735.

If this predetermined relationship does exist, the Control_Limit is adjusted by one (here, raised by one) and the method then moves on to step 735. Adjusting the control limit in this way causes the system to not report a fault during heat recovery periods unless the actual Building_Temperature is substantially below the setpoint.

At block 735, the current Home_Temperature is compared to the Setpoint for the existance of a predetermined relationship, here, is the Home_Temperature greater than or equal to the Setpoint. If the answer is yes, the method at block 740 causes the Control_Limit to be set equal to the Setpoint, the Temperature_Error to be set equal to zero, the Step_Timer to be reset to equal Z, and the process returns to step 710.

If the Home_Temperature is less than the Setpoint at block 735, the method moves to block 745 at which the Home_Temperature is compared to the Control_Limit for determining the current relationship therebetween, here, is Home_Temperature greater than or equal to Control_Limit. If yes, Temperature_Error is reset to zero and the method returns to block 710. If no, Temperature_Error is set equal to the previous Temperature_Error plus the Control_Limit minus the Home_Temperature at block 755. Then, to determine if a fault exists, the Temperature_Error is compared to a predetermined Error_Limit. The Error_Limit represents an accumulated error over time which would be indicative of a HVAC system fault. In a preferred embodiment, Error_Limit is equal to 60 degree Minutes (in degrees Fahrenheit). If Temperature_Error exceeds Error_Limit, the method at block 765 causes an alarm message to be created. The alarm message may be sent by the alarm panel to a remote monitoring station, not shown, which monitors the status of alarm panels at building sites. Such alarm monitoring stations are well known in the art.

FIG. 7A shows a flow chart, similar to FIG. 7, for when the HVAC system is in a cooling mode. Note that minor differences exist in blocks 718A, 725A, 730A, 735A, 745A and 755A.

Figure 8:
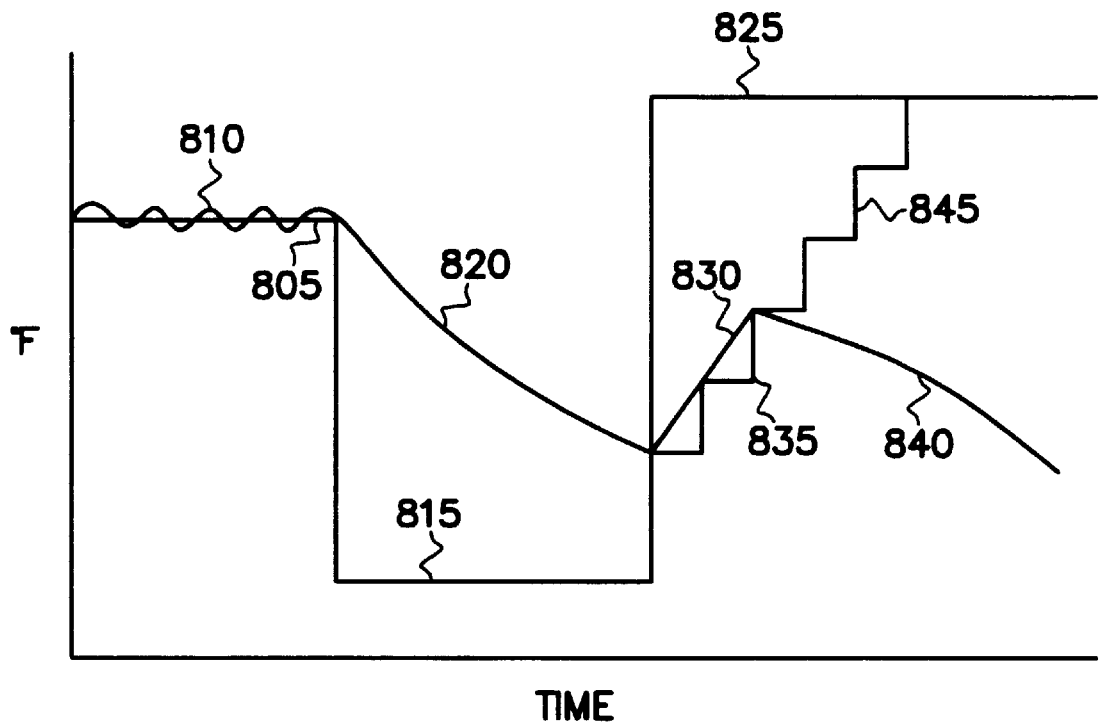
FIG. 8 is a graph showing a comparison of a Setpoint, an actual Building Temperature and a Control_Limit versus time.

Referring now to FIG. 8, thereshown is a graph which compares over time, sample Setpoints, Building Temperatures and Control_Limits when a thermostat is in a heating mode. At 805, the a first setpoint has been selected and the Building Temperature 810 varies slightly in the area of the setpoint. In this region, the Control_Limit as defined by the steps shown in FIG. 7 is the same as the setpoint.

When the temperature is set back in region 815, the Building Temperature may drift down toward the setpoint as shown by 820. Again, according to the steps shown in FIGS. 7, the Control_Limit is the same as the setpoint.

When a temperature recovery period has begun as shown in region 825, the steps of FIGS. 7 cause the control limit to be initially set to the current temperature, and steps the control limit up as the step timer expires. As can be seen from region 830, if the HVAC plant is operating correctly, the Building Temperature will rise.

If an HVAC fault occurs and the HVAC system is no longer operating, the Building temperature will begin to fall, while the Control_Limit contiues to rise to meet the setpoint. Once the Building Temperature has fallen below the control limit, the steps of FIG. 7 will cause the Temperature_Error to accumulate and be compared to the Error_Limit.

The foregoing has been a description of a novel and non-obvious method and system for remotely monitoring the performance of an HVAC system in a building. The applicants have herein described the embodiment of the invention which was the best mode of practicing the invention contemplated by them at the time of execution of this application. However, the applicants do not intend the foregoing description to be viewed as limiting, and define the limits of their invention by the claims appended hereto.

We claim:

1. Apparatus for controlling and monitoring temperature in a space over time so as to determine therefrom indications of whether faults in an HVAC system may have occurred and report those faults, wherein the HVAC conditions in the space are affected by the HVAC system, comprising:

an alarm system for receiving an indication of HVAC fault conditions related to the space and reporting said HVAC fault conditions to a monitoring station through a communications medium;

a thermostat in communicating connection to said alarm system, said thermostat for controlling the temperature in the space;

error detector connected to said alarm system and said thermostat for detecting a presumed HVAC fault condition in the HVAC system by monitoring temperature from said thermostat, said error detector connected to trigger said alarm system reporting to said monitoring station said HVAC fault condition upon its detection wherein said error detector maintains an accumulated error value over time, said accumulated error value being equal to a past accumulated error value plus a current error value representative of a difference between a control limit set by the alarm system and an actual space temperature measured by the thermostat, said error detector indicating the HVAC fault condition to said alarm system when said accumulated error value attains a first predetermined relationship with an error value suggestive of a fault condition within said predetermined time.

2. The apparatus of claim 1, wherein:

said accumulated error value is reset to zero whenever said control limit has a second predetermined relationship with said space temperature.

* * * * *